United States Patent
Kirshenbaum et al.

(10) Patent No.: US 10,042,752 B2
(45) Date of Patent: Aug. 7, 2018

(54) OBJECT DESCRIPTORS

(71) Applicant: Hewlett Packard Enterprise Development LP, Houston, TX (US)

(72) Inventors: Evan R. Kirshenbaum, Palo Alto, CA (US); Lokesh Gidra, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 263 days.

(21) Appl. No.: 15/167,563

(22) Filed: May 27, 2016

(65) Prior Publication Data

US 2017/0344468 A1 Nov. 30, 2017

(51) Int. Cl.
*G06F 12/00* (2006.01)
*G06F 12/02* (2006.01)

(52) U.S. Cl.
CPC ........ *G06F 12/023* (2013.01); *G06F 12/0261* (2013.01); *G06F 2212/1056* (2013.01)

(58) Field of Classification Search
CPC ............... G06F 12/023; G06F 12/0261; G06F 2212/1056
USPC ................................ 711/147, 156, 171, 172
See application file for complete search history.

(56) References Cited

U.S. PATENT DOCUMENTS

| | | | |
|---|---|---|---|
| 5,075,848 A | 12/1991 | Lai et al. | |
| 7,159,223 B1 | 1/2007 | Comeau | |
| 7,584,232 B2 | 9/2009 | Guo | |
| 7,716,258 B2 | 5/2010 | Dussud | |
| 7,788,300 B2 | 8/2010 | Kuck et al. | |
| 8,694,562 B2 | 4/2014 | Basu et al. | |
| 2008/0077973 A1* | 3/2008 | Zimmer | G06F 9/468 726/2 |
| 2008/0209149 A1 | 8/2008 | Meyer | |
| 2010/0185703 A1 | 7/2010 | Ylonen | |
| 2010/0287216 A1 | 11/2010 | Ylonen | |
| 2015/0227414 A1 | 8/2015 | Varma | |

OTHER PUBLICATIONS

Pizlo, F. et al., "Stopless: A Real-Time Garbage Collector for Multiprocessors," Proceedings of the 6th International Symposium on Memory Management, ACM, Nov. 1, 2007, 11 pages, available at http://www.cs.technion.ac.il/~erez/Papers/stopless.pdf.
Stackoverflow, "Precise Mode in Boehm Garbage Collector," (Web Page), Jul. 21, 2011, 4 pages, available at http://stackoverflow.com/questions/6774605/precise-mode-in-boehm-garbage-collector.

\* cited by examiner

*Primary Examiner* — Reba I Elmore
(74) *Attorney, Agent, or Firm* — Hewlett Packard Enterprise Patent Department

(57) ABSTRACT

In one example in accordance with the present disclosure, a method may include identifying, by a first operating system process in a computer system accessing a shared memory heap, a first object at a first memory address in the shared memory heap. The first object may have been previously allocated in the shared memory heap by a second operating system process. The method may also include identifying an object descriptor associated with the first object at a second memory address in the shared memory heap. The object descriptor occupies a number of bits of memory independent of the type. The method may also include determining a size of the first object based on the object descriptor, enumerating, based on the object descriptor, fields associated with the first object and performing an action based on each field of the enumerated fields.

15 Claims, 5 Drawing Sheets

US 10,042,752 B2

OBJECT DESCRIPTORS

BACKGROUND

Objects with dynamic scope may be allocated on a heap within the memory of the system on heap memory acquired from an allocator. For such objects, the decision as to when the object may be deleted and the memory occupied by the object returned to the allocator for use in future object allocations becomes important and may be made according to a memory management policy, which may be imposed by the programming environment (e.g., by the choice of programming language) or chosen by the programmer.

BRIEF DESCRIPTION OF THE DRAWINGS

The following detailed description references the drawings, wherein.

DETAILED DESCRIPTION

Figure 1A:
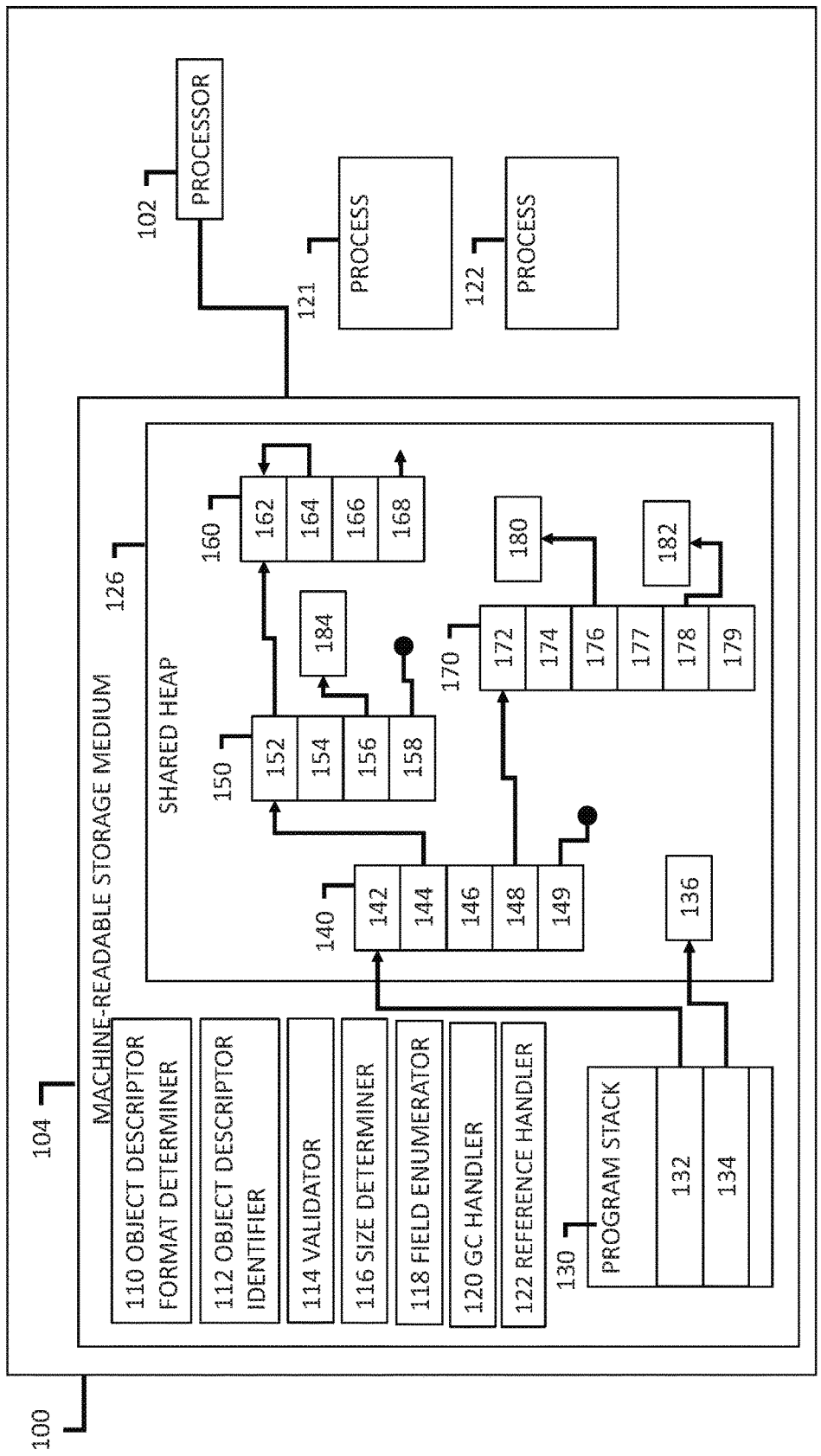
FIG. 1A is a block diagram of an example environment in which object descriptors may be useful.

Computer systems may execute instructions corresponding to programs (also known as applications or scripts) written by programmers. These programs may be written in different programming languages (e.g., C++, Java, Perl, or Python). The instructions may execute on processors (e.g., central processing units (CPUs), graphical processing units (GPUs), field-programmable gate arrays (FPGAs), or application-specific integrated circuits (ASICs). A "process" (or "operating system process" or "running program" or "running application") is an instance of the execution of a program on a computer system. As used herein, the term "process" refers to the instance of the execution of the program on the computer system and not to a procedure or method. A computer system may include multiple processes executing simultaneously on separate processors, on separate cores within the same processor, or in a time-sharing manner on the same core or processor. Multiple processes may execute (or run) the same program, either simultaneously or at different times. A process may include multiple threads (or execution threads) that may run concurrently, each executing instructions corresponding to a part of the program (e.g., a procedure, function, or method), with different threads executing the same or different parts of the program.

A computer system may include memory for the storage of data. Data available to a process may be private memory or shared memory, where shared memory may be available to other processes as well, either concurrently or before or after the lifetime of the process. Data within a process may be stored on an execution stack (or program stack or thread stack), at a static location in memory (e.g., a global variable, class static variable, or function static variable), or on a heap. Data stored on a heap may be placed at a location (e.g., a memory address) obtained by the process from a memory allocator, which may be provided by the program, by a library linked with the program, or by the computer system (e.g., by an operating system running on the computer system). The amount of memory provided (or allocated) by the memory allocator may be of a size based on an object type specified with the allocation request. The object type may specify the size of the object and the intended interpretation of memory locations within the object (e.g., the types of fields within the object). Types may be provided by the programming language or specified by the programmer. Different programs, and therefore different processes, may know about some types and not know about others, and the same type may have different realizations (e.g., different sizes or different fields) when specified by different programs, different programming languages, or different versions of the same program or programming language.

The data accessed within a computer system may comprise a set of objects (also known as records, structures, instances, or simply data values) stored in the memory or storage of the computer system. Access to objects may be by use of pointers (or references or links) that contain sufficient information to identify the object they refer to. This information may include an address of the object, an offset relative to a base address, a key that can be looked up in a table, or other information. These pointers may be stored within processor registers, on a program stack, in global variables, within objects, and elsewhere. An object may have a static lifetime or a dynamic lifetime. For an object with a static lifetime, the memory occupied by the object may be made available for use by other objects at a well-defined point in the execution of the program, e.g., at the end of a function or block or upon program termination.

Correct memory management may present challenges. If an object is deleted while there are still pointers to it, when a process tries to read or write data using such "dangling" pointers, it may read garbage, break the allocator, and/or corrupt objects that were subsequently allocated in the memory formerly occupied by the deleted object. This may lead to incorrect program behavior, program crashes, or system crashes, and may have effects outside of the computer system if the computer system controls external devices or provides data to systems that do. If objects are not deleted when there are no further pointers to them (i.e., after they have become "garbage"), the memory consumed by the objects may be said to have been "leaked". The objects will continue to take up space in the memory and the memory available for further computation may be reduced.

When programs running in different operating system processes share a shared heap, the consequences of incorrect memory management may extend outside of the responsible process, so processes sharing a heap may be required to cooperate to ensure that memory management is performed correctly. In some systems, these cooperating processes may be running programs written by different programmers not intending for the programs running in the process to cooperate at an application level. One such program may allocate objects whose types are unknown to another such program. And the programs may be written in different programming languages and may have different rules for the layout of objects within memory. Processes may terminate intentionally or unexpectedly at any time.

When the memory comprising the shared heap includes non-volatile memory (i.e., memory whose content is not erased when the devices used to implement it loses power), the consequences of incorrect memory management, including the improper reduction of available memory, may persist across device restarts.

Memory management policies may be classified as explicit (also known as manual) memory management and automatic (or automated) memory management. When using explicit memory management, the program may determine, according to rules specified by a programmer, when each object on the heap is to be deleted and explicitly requests its deletion. When using automatic memory management, the program allocates objects and manipulates references to them, but facilities outside of the program (e.g., in a library linked with the program or provided by the programming language the program is written in) are responsible for determining an appropriate time to delete the objects.

In the family of automatic memory management techniques known as garbage collection, objects may be allocated on a heap managed by a garbage collector. When an object is allocated, unused space is identified on the heap, and the object is created in that space. The job of the garbage collector is to identify regions of memory in the heap that it can determine with certainty do not contain any objects that may be accessed by a process that has access to the heap (called garbage) and use these identified garbage regions for potential future allocations. To accomplish this, the garbage collector may first identify regions of memory in the heap that are occupied by objects for which there is a possibility that some process may access them in the future. Such objects may be called reachable (or live) objects. Objects may be identified as reachable by being the targets of references found in a particular location, such as on a program stack or in a global variable. Such references may be called "root pointers". Objects may also be identified as reachable by being referred to by a reference contained in a reachable object. Upon identifying a reachable object, the garbage collector may use the size of the object and the location of the object in the heap to ensure that the memory occupied by the object is not considered to be garbage. If the object contains references to other objects in the heap, the garbage collector may enumerate these references and identify the objects they refer to as live objects. By this recursive procedure, all reachable objects in the heap may be identified, and all memory in the heap that does not contain any reachable object may be identified as garbage and given to the allocator for use in allocating new objects.

In the family of automatic memory management techniques known as reference counting, each object may contain or otherwise be associated with a number, referred to as a reference count, which may indicate a number of pointers to an object that are known to exist. Pointers reflected in an object's reference count may be called reference counted (or counting) pointers (or references) or shared pointers (or references). When a shared pointer is copied, the reference count of the object it refers to may be incremented. When a shared pointer is destroyed or overwritten by an assignment, the reference count of the object it formerly referred to may be decremented. A reference count being decremented to zero may be indicative of there being no further shared pointers referring to the object, and the object may be deleted and its space made available for future object allocation. Once it the object is deleted, any shared pointers it contains will no longer count as references to the objects they refer to, so prior to returning the memory to the allocator, all shared pointers within the object may be enumerated, and the reference counts of the objects they refer to may be decremented. This may lead to some of these reference counts being deleted to zero and causing the deletion of those objects in a recursive manner. When all shared pointers have been accounted for, a region of memory within the heap based on the location of the object and the size of the object may be returned to the allocator for use in allocating new objects.

Example systems and methods for object description described herein may allow processes to understand the layout of objects in a shared memory heap and to assist in memory management. Specifically, the example systems and methods described allow determination of the size of an object as well as the location of pointers to further objects. The example systems and methods may be used, for example, in systems employing garbage collection and/or reference counting. Object size determinations may be made by a garbage collector during a tracing phase and by a reference counter when it has decided that it has removed the last pointer to an object. Example systems and methods described allow determination of whether or not a pointer actually points to an object. This may be determined by a garbage collector for an unmanaged language (such as C++) when scanning a thread's stack to identify root pointers.

Example systems and methods for object description described herein may efficiently encode both the size and location of pointers in an object in a way that allows processes (including processes from different applications) to identify pointers within objects that are created by other processes and to cooperate in automatic memory management without knowledge of the types of the objects encountered.

Importantly, the process determining the size of an object may be different from the process that allocated the object in the shared memory heap, and the two processes may be running programs that were specified using different programming languages. The type specified by the allocating process when the object was allocated may be unknown to the process determining the object's size, and the two processes may have no knowledge of one another nor any means of communicating with one another. Further, the allocating process may no longer exist at the time the size is determined.

An example method may include identifying, by a first operating system accessing a shared heap, a first object at a first memory address in the shared memory heap. The object may have been previously allocated in the shared memory heap by a second operating system process in the computer system that is different from the first operating system process. The first object may be of a type not known to the first operating system process. The method may include identifying, based on the first memory address, an object descriptor associated with the first object at a second memory address in the shared memory heap. The object descriptor may occupy a number of bits of memory independent of the type. The method may further include determining a size of the object based on the object descriptor, enumerating, based on the object descriptor, fields associated with the object, and performing an action based on each field of the enumerated fields.

FIG. 1A is a block diagram of an example system 100 for object description. System 100 may include a processor 102 and a memory 104 that may be coupled to each other through communication link (e.g., a bus, network, or memory fabric). Processor 102 may include a Central Processing Unit (CPU), Graphics Processing Unit (GPU), Field-Programmable Gate Array (FPGA), Application-Specific Integrated Circuit (ASIC), or another suitable processor, and may have one or more processing elements or cores. Although a single instance of processor 102 is depicted, it should be understood that system 100 may include any number of instances and different instances may be of different types. In some examples, memory 104 stores machine readable instructions executed by processor 102 for system 100. Memory 104 may include any suitable combination of volatile and/or non-volatile memory, such as combinations of Random Access Memory (RAM), Dynamic Random Access Memory (DRAM), Read-Only Memory (ROM), flash memory, memristor memory, resistive memory, phase-change memory, spin-transfer torque memory, and/or other suitable memory. System 100 may comprise a single device, such as a computer, server, workstation, laptop, phone, wearable device, or peripheral, or it may comprise multiple instances of the same or multiple types of device connected via a network, bus, backplane, or fabric. Such connection may be electrical, photonic, wireless, or by other means.

System 100 may include one or more processes (e.g., 121, 122). Processes may start and terminate at various times, and the number of executing processes 121, 122 may vary over time.

Memory 104 may include one or more program stacks 130, which may each be private to one process. For example, if program stack 130 is private to process 121, process 122 may not be able to access the contents of program stack 130. Multiple program stacks 130 may be associated with the same process, e.g., for different threads associated with that process. Other parts of memory 104 may be private to different processes.

Memory 104 may also include memory shared between processes. For example, shared heap 126, which may be accessible to both process 121 and process 122. The shared heap 126 may contain one or more objects, e.g., objects 140, 150, 160, 170, 180, 182, and 184. Different objects may have been allocated in shared heap 126 by different processes. For example, object 150 may have been allocated by process 121, object 140 by process 122, and object 170 by a process which is no longer part of system 100. Each object may be associated with a type (also known as an object type or class), which allows processes running programs that know the type to interact with the object on a semantic level. An object associated with an object type may be called an instance of that object type. An object type, e.g., the type of object 170, may be known to multiple processes. Other object types, e.g., the type of object 140, may be known to some processes (e.g., process 122) and unknown to others (e.g., process 121). The representation of an object in the shared heap 126 may lack an indication of the associated object type. When the representation of an object contains an indication of the associated object type, the indication may be in a form that is not interpretable to some processes accessing the shared heap 126.

Each object may be located at a memory address within the shared heap 126, where a memory address may be a number that allows processor 102 to access and modify the data located at a particular location within memory 104. In some examples, objects (e.g., object 140) may be in regions of memory 104 private to a single process (e.g., process 121). Different processes may use different memory addresses for the same memory location within shared heap 126. For that reason, it may be desirable to refer to a memory location by means of a process-neutral address. An example of a process-neutral address may be an offset from the beginning of shared heap 126. Given a process-neutral address, process 121 may add the offset to its memory address for the beginning of shared heap 126 to get its memory address for the location. Process 122 may do the same with its memory address for the beginning of shared heap 126, which may be different, to obtain its memory address for the location, which may be different but will allow it to access the location. Memory addresses may refer to particular bytes in memory 104, where a byte may be a unit of memory comprising eight bits. A "word" of memory may be a unit of memory containing a fixed number of bits larger than a byte. A word may typically be an integral number of bytes. The size of a word may be chosen to be a natural size specified by processor 102 and may be the number of bits used by processor 102 as a memory address. Typical word sizes may be 32 bits (four bytes) and 64 bits (eight bytes). When a word size is a power of two, there may be a constraint that the address of a word in memory 104 is aligned on word boundaries, with a location being word-aligned if it can be construed as an integral multiple of words. For ease of explanation, a word will be assumed to be 64 bits (eight bytes) and word addresses will be assumed to be aligned, although different word sizes or alignment decisions could be used with the techniques and methods discussed herein. This alignment requirement implies that the address of a word in memory 104 will always be a multiple of eight and that, therefore, the low-order three bits of word address will be zero. Further, the address of an object may be assumed to be word-aligned. For the depiction of objects in FIG. 1A, the vertical representation is intended to represent consecutive words in the memory, and the address of the topmost word is the address of the object as a whole. For example, the address of object 140 is the same as the address of word 142, which is followed consecutively by words 144, 146, 148, and 149. The whole of object 140 is five words (40 bytes) in size.

The object type associated with an object may describe one or more data members contained within instances of that object type, and each data member may be associated with its own object type and may occupy a number of bytes in memory. The sizes and types of the data members of an object may be known to some, but not necessarily all, processes. For example, object 140 may be associated with a Person type and may have as data members, an address (a pointer to an object of type Address), an age (an integer), a marital status indicator (a Boolean value or a small enumeration), a list of children (a pointer to an array of pointers to objects of type Person), and a spouse (a pointer to an object of type Person). Some data members of an object may occupy a single word, some may occupy less than a word, and some may occupy more than a word. In the given example, the address, list of children, and spouse, being pointers to objects, may occupy a single word, while the age and marital status indicator may occupy less than a word. It may be assumed that the size of an entire object is an integral number of words, which may include padding after some data members to ensure that each data member of a pointer type is word-aligned and that an object which follows the object in the shared heap 126 is word-aligned. With these assumptions, word 142 may contain the object descriptor associated with object 140, word 144 may contain its address pointer, referring to object 150, word 148 may contain its children pointer, referring to object 170, and word 139 may contain its spouse pointer, which may be a null pointer (a pointer that does not refer to any object). Word 146 may contain both the age (e.g., in the high-order 32 bits), the marital status indicator (e.g., in the next 8 bits), and three bytes of padding to ensure proper alignment of the next data member. Even though object 140 contains five data members (excluding the object descriptor), for purposes of enumeration of pointers it contains, it is considered to contain only four fields, where a field is a word within the object, three of which (144, 148, and 149) are pointer fields (or reference fields), which contain (possibly null) pointers to other objects in the shared heap 126.

Memory 104 stores instructions to be executed by processor 102 including instructions for an object descriptor format determiner 110, an object descriptor identifier 112, a validator 114, size determiner 116, a field enumerator 118, GC handler 119, reference handler 120 and/or other components. According to various implementations, system 100 for managing objects may be implemented in hardware and/or a combination of hardware and programming that configures hardware. Furthermore, in FIG. 1A and other Figures described herein, different numbers of components or entities than depicted may be used.

Given a memory address or other reference to an object, such as the memory address for object 140, processor 102 may execute instructions of object descriptor identifier 112 to locate an object descriptor for the object. The object descriptor may be stored as the first word of the object, in which case the memory address for an object's object descriptor may be the same as the memory address for the object. In other examples, the object descriptor may be stored as the word preceding the first word of the object, in which case the memory address for an object's object descriptor may be computed by subtracting the number of bytes in a word (e.g., 8) from the memory address of the object. Other displacements or methods of computing the address of the object descriptor may be used. In some systems, different objects may have object descriptors of different sizes. For example, in systems in which shared heap 126 is stored in non-volatile memory, it may be desirable to change the system such that newly-allocated objects will have object descriptors of a size different from the size of object descriptors for previously-allocated objects. In such a system, object descriptor identifier 112 may proceed in two steps: a first step to locate and interpret a word in memory to allow it to identify the size of the object descriptor and a second step to identify the memory address of the object descriptor itself. In such systems, the size of the object descriptor may be independent of the object type of the object. In other words, object descriptor identifier 112 may identify, by a first operating system process in a computer system accessing a shared memory heap, a first object at a first memory address in the shared memory heap. The first object may have been previously allocated in the shared memory heap by a second operating system process in the computer system different from the first operating system process. The first object is of a type not known to the first operating system process. Object descriptor identifier 112 may also identify, based on the first memory address, an object descriptor associated with the first object at a second memory address in the shared memory heap. The object descriptor may occupy a number of bits of memory independent of the type.

Figure 1B:
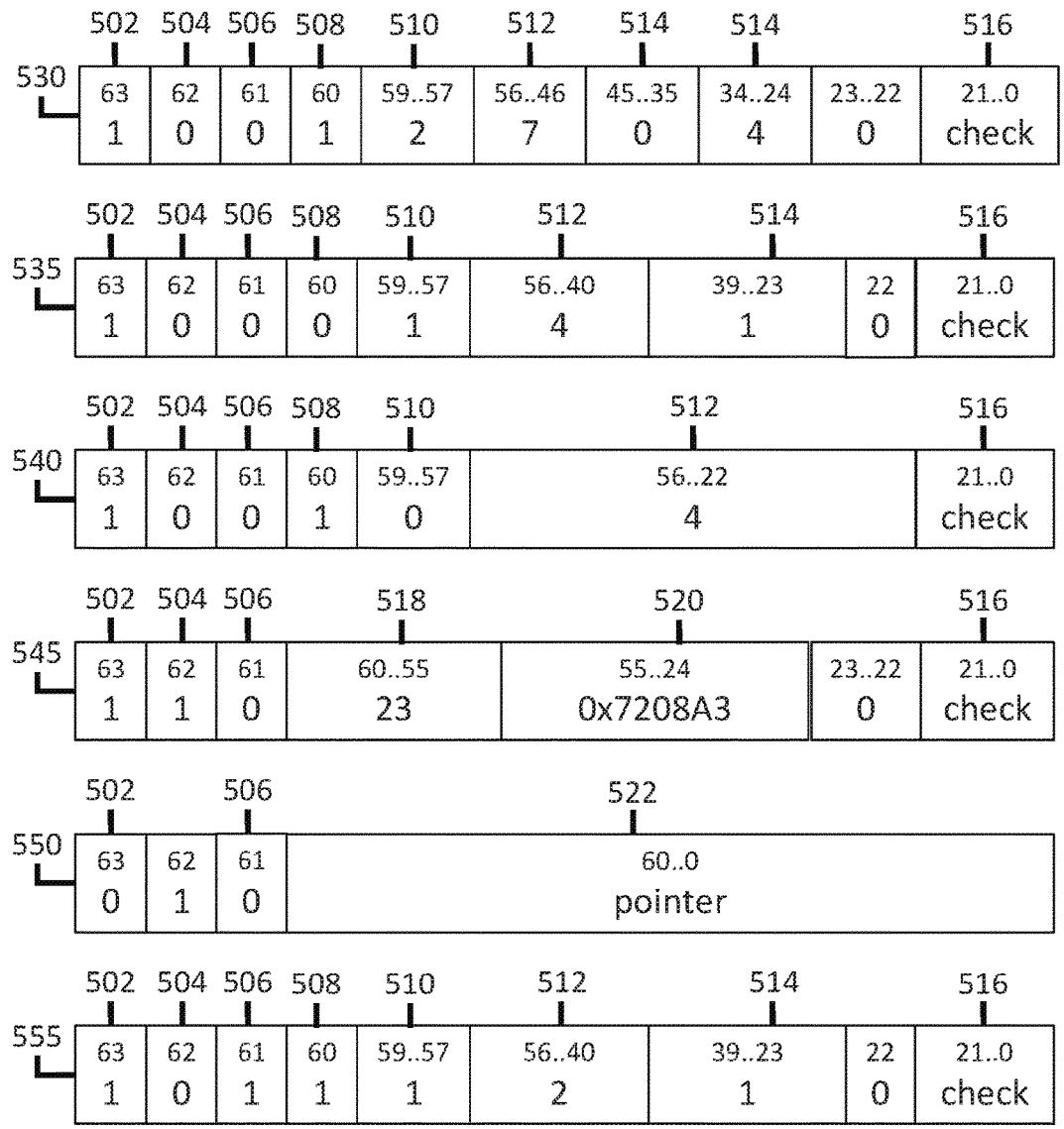
FIG. 1B is a block diagram of object descriptors in several formats.

Given a reference to (e.g., a memory address of) an object descriptor for an object, object descriptor format determiner 110 may examine the object descriptor and determine the object descriptor's format, which will guide other modules (e.g., validator 114, size determiner 116, and field enumerator 118) in interpreting the bits of the object descriptor's value as a word. By having different formats optimized for different types of object layout, object descriptors of a small fixed size may suffice to describe the memory layout of a wide variety of object types. Object descriptors in several formats are shown in FIG. 1B and will be described below, including list object descriptors 530, 545, and 555; include list object descriptors 530 and 555; exclude list object descriptor 535; blob object descriptor 540; bitmap object descriptor 545; external object descriptor 550; and array object descriptor 555. Not all of these formats may be supported by a given system 100, and a system 100 may support formats not shown. Object descriptor format determiner 110 may determine that an object descriptor is an example of multiple formats. For example, object descriptor 555 is simultaneously a list object descriptor, more specifically an include list object descriptor, and an array descriptor.

In the depiction of object descriptors in FIG. 5, each row represents the contents of a single word, and the boxes within a row represent the values of individual bits and ranges of bits within the word, with the leftmost bit being the most significant bit (bit 63) and the rightmost bit being the least significant bit (bit 0). The particular numbers and orders of bits and bit ranges and the widths of bit ranges should be treated as exemplary only.

Object descriptor format determiner 110 may examine the value of the is-compact bit 502 (bit 63) of the object descriptor to determine with the object descriptor is a compact object descriptor (e.g., compact object descriptors 530, 535, 540, 545, and 555) or an external object descriptor (e.g., external object descriptor 550). A particular value of the is-compact bit 502, e.g., a value of 1, may indicate a compact object descriptor, while a different value, e.g., a value of 0, may indicate an external object descriptor. A compact object descriptor may be an object descriptor whose value (e.g., the contents of the object descriptor itself) are sufficient to allow size determiner 116 and field enumerator 118 (described below) to provide information about the described object. An external object descriptor may be an object descriptor whose value allows the location of another object, e.g., external descriptor object 160, on the shared heap 126 to be consulted by size determiner 116 and field enumerator 118. Size determiner 116 may determine a size of the first object based on the object descriptor. In some aspects, size determiner 116 may determine that the object descriptor is an external object descriptor and determine a size of the first objected based on an external descriptor object referenced by the object descriptor.

To facilitate the identification by validator 114 (described below) of a word in the shared heap 126 as not containing a valid object descriptor, another bit of a compact object descriptor, e.g., bit 62, may be constrained to have a value of 1 to make it less likely that a random word in memory could be construed as an external object descriptor.

If the object descriptor is determined to be a compact object descriptor, object descriptor format determiner 110 may examine the value of the is-bitmap bit 504 (bit 62) of the object descriptor to determine whether the compact object descriptor is a bitmap object descriptor (e.g., bitmap object descriptor 545) or a list object descriptor (e.g., list object descriptors 530, 535, 540, and 555). A particular value of the is-bitmap bit 504, e.g., a value of 1, may indicate a bitmap object descriptor, while a different value, e.g., a value of 0, may indicate a list object descriptor. A bitmap object descriptor may be an object descriptor whose value contains an indication for each field within the object as to whether that field is a reference field. A list object descriptor may be an object descriptor whose value contains the indexes within the object of zero or more fields of the object.

If the object descriptor is determined to be a list object descriptor, object descriptor format determiner 110 may examine the value of the include-fields bit 508 (bit 60) to determine whether the list object descriptor is an include list object descriptor (e.g., include list object descriptors 530, 540, and 555) or an exclude list object descriptor (e.g., exclude list object descriptor 535). A particular value of the include-fields bit 508, e.g., a value of 1, may indicate an include list object descriptor, while a different value, e.g., a value of 0, may indicate an exclude list object descriptor. An include list object descriptor may be one whose listed field indexes identify pointer fields within the object. An exclude list object descriptor may be one whose listed field indexes identify non-pointer fields within the object, implying that all other fields within the object are pointer fields.

In addition to the above determinations, object descriptor format determiner 110 may examine the value of the is-array bit 506 (bit 61) to determine whether the object descriptor is an array object descriptor such as array object descriptor 555. A particular value of the is-array bit 506, e.g., a value of 1, may indicate an array object descriptor, while a different value, e.g., a value of 1, may indicate a non-array object descriptor. An array object descriptor may be the object descriptor for an object which is an array (e.g., a fixed-size sequence of values), where the object descriptor ignoring the is-array indication may describe the individual elements of the array.

A further object descriptor format that may be determined by object descriptor format determiner 110 may be an embedded object descriptor, which may be used to signal that the object being pointed to is contained within an object on the shared heap 126 and not independently allocated. An embedded object descriptor may contain a relative offset or other information suitable to locate the independently allocated object in which the object is contained (the embedding object). The embedding object may further have an embedded object descriptor. An example embedded object descriptor at the third word of an object may contain an offset of 3. When a garbage collector determines an object to be reachable and that object's object descriptor is determined to be an embedded object descriptor, the garbage collector may on this basis determine that the embedding object is reachable. In a system that employs reference counting, when an attempt is made to modify the reference count of an object with an embedded object descriptor, the reference count of the embedding object may be modified instead.

Given an object descriptor of determined format and a reference to an object, size determiner 116 may compute the size of the object in words or bytes, where this size may include the object descriptor. When the object descriptor is not an array object descriptor, size determiner 116 may compute the number of fields contained in the object (excluding the object descriptor) and add one word for the object descriptor to obtain a size in words. If a size in bytes is desired, this may be multiplied by the number of bytes in a word. When the object descriptor is an array object descriptor, size determiner 116 may examine the object to obtain an array length. When the address of the object descriptor is the same as the address of the object, the array length may be obtained by reading the word following the object descriptor. If example object 170 is an array object, word 172 may contain the array object descriptor, and word 174 may contain the array length. When the address of the object descriptor is one word less than the address of the object, the array length may be obtained by reading the word preceding the object descriptor. The object size of an array object may be computed by multiplying the number of fields contained in each element of the array, as determined by examining the object descriptor and ignoring the is-array indication, by the array length and adding one word for the object descriptor and one word for the array length.

Field enumerator 118 may enumerate, based on the object descriptor, fields associated with the first object. Given an object descriptor of determined format and a reference to an object, field enumerator 118 may identify and enumerate fields within the object that contain possibly-null references to other objects in the shared heap 126. When additionally provided an action (e.g., a function, method, or procedure), field enumerator 118 may invoke (or call or run or perform) the action, passing in the pointer or the address of the word in memory containing the pointer. In some examples, field enumerator 118 may omit enumerating fields that contain null references. For example, when enumerating object 140, field enumerator 140 may enumerate the pointer to object 150 contained in word 144, the pointer to object 170 contained in word 148, and, optionally, the null pointer contained in word 149. When the object descriptor is an external object descriptor, field enumerator 118 may further enumerate the pointer to the external descriptor object contained in the external object descriptor. When the object descriptor is an array object descriptor, field enumerator 118 may obtain the array length as described above and may determine the memory address of the first element of the array. It may compute an element object descriptor by removing the is-array indication from the object descriptor. Based on the element object descriptor, it may enumerate the fields of the element. In doing so, it may pretend that the element does not contain an object descriptor. It may then determine the memory address of the next element of the array, if any, by obtaining a size of the element object descriptor from size determiner 116, adjusting to remove the object descriptor, and adding this to the memory address of the first element. Field enumerator 118 may then process the second element and repeat this process until all array elements are exhausted. Field enumerator 118 may enumerate pointer fields of an object by enumerating pointer field indexes of the object descriptor. For each enumerated pointer field index, a pointer field may be identified by adding the pointer field index as a number of words to the memory address of the first non-object-descriptor field of the object, which may be the memory address of the word following the word containing the object descriptor for an object that is not an array object. For example object 140, the object descriptor may be stored in word 142, and words 144, 146, 148, and 149 may have field indexes 0, 1, 2, and 3, respectively. When enumerating fields of an object in an array, the object may not contain an object descriptor. If example object 170 is an array object in which each element contains two fields, the first element of array may be at word 176 and the second element of the array may be at word 178. The field indexes of words 178 and 179 may be 0 and 1 for the second element of the array.

In some aspects, object descriptor identifier 112 may determine that the object descriptor is an array descriptor and identify a first object corresponding to the object descriptor as an array. Size determiner 116 may determine an array length of the array based on a third memory address in the shared memory heap relative to the second memory address. Field enumerator 118 may enumerate fields associated with the first object by enumerating, based on the object descriptor, fields associated with each element of the array.

Validator 114 may be invoked to determine whether a word at a given memory address contains or does not contain an object descriptor and, therefore, whether a reference to such a word is a pointer to an object. Validator 114 may be able to tell with certainty that a word does not contain an object descriptor and with very high probability that a word does contain an object descriptor. For example, validator 114 may determine that word 132 contains a pointer to an object, specifically object 140, and also that word 134, whose putative object reference would refer to word 136, does not contain a pointer to an object because word 136 does not contain a valid object descriptor. This may be useful in a system that employs garbage collection when trying to identify root pointers from a location such as program stack 130, which may contain a mixture of pointers and non-pointers. Each word on program stack 130 may be considered to contain a putative object reference and its contents read. After determining that the contents of the word could plausibly be a pointer to a word in the shared heap 126 (e.g., by checking to see that resulting memory address is word-aligned and falls within the bounds of the shared heap 126), validator 114 may be invoked. Validator 114 may invoke object descriptor identifier 112 to obtain a reference to a putative object descriptor that would be the object descriptor of the referenced object if it was, in fact, an object. It may then invoke object descriptor format determiner 110 to determine a format for the putative object descriptor.

If the putative object descriptor is identified as a putative external object descriptor, validator 114 may obtain the memory address of what would be its associated external descriptor object, e.g., external descriptor object 160. It may then identify a word relative to that memory address that would contain a check pointer, such as check pointer 164. If this word contains a pointer to the external descriptor object it is contained in, as word 164 contains a pointer to external object 160, validator 164 may determine that the putative external descriptor object is a valid external descriptor object and, therefore, the putative external object descriptor is a valid external object descriptor, and the putative object reference is an actual object reference. As the odds of a random pair of words (putative external object descriptor and putative check pointer) passing this test may be very small, the validator 114 may declare the putative object reference to be valid with virtual certainty. If, on the other hand, the check pointer does not point to the putative external descriptor object, the validator 114 may declare with certainty that the object reference is not an actual object reference.

If the putative object descriptor is identified as a putative compact object descriptor, validator 114 may obtain the value of the bits of the putative object descriptor contained in check bits 516 (e.g. bits 0 through 21). As the external descriptor object 160 contained a check pointer 164 that referred to the external object descriptor object 160, check bits 516 may contain verification information in the form of a partial pointer to the location containing the object descriptor that contains it. To determine the correct verification information for an object descriptor stored at a given memory address, the validator 114 may subtract out the memory address of the beginning of the shared heap 126 to obtain an offset in the shared heap 126. Since the memory address may be assumed to be word-aligned, the result may be shifted to the right by three bits (or, equivalently, divided by eight) to remove the three low-order zero bits. The low-order bits of this result of the width of the check bits 516 bit range (e.g., 22 bits) may be the validation bits. As the correct verification information would have been added to an object descriptor when the object was allocated, the correct verification may be compared with the putative verification information contained in the putative object descriptor. If these do not match, validator 114 may determine with certainty that the putative object descriptor is not a valid object descriptor and that therefore the putative object reference is not an actual object reference. If they do match, validator 114 may determine with high confidence that the putative object descriptor is a valid object descriptor and that therefore the putative object reference is an actual object reference. The odds of a random word being determined to be a compact object descriptor and containing the correct validation information, for 22 bits of check bits 516 is one in 8,388,608. If greater certainty is desired, validator 114 can perform further tests described below.

In some aspects, validator 114 may identify a putative object reference, identify, based on the putative object reference, a putative object descriptor comprising verification information, determine a validity of the putative object descriptor based on the verification and determine that the putative object reference is not an object reference based on the validity. Determining the validity may include comparing the verification information with a value computed based on an address of the putative object descriptor.

When an object descriptor is a list object descriptor, a collection-size bit range 510 (e.g., bits 57 through 59) may be consulted to determine the size of the collection. For example, in list object descriptor 530, the collection size is 2, representing a collection of two field indexes. In list object descriptors 535 and 555, the collection size is 1, and in list object descriptor 540, the collection size is 0. An include list object descriptor whose collection size is zero may be called a blob object descriptor and may be used to describe an object that contains no pointers. For purposes of efficiency, a blob object descriptor, not marked as an array object descriptor, may be used to describe an array object whose elements contain no pointers. An exclude list object descriptor whose collection size is zero may be called a reference array object descriptor and may be used to describe an object that contains only pointers. For purposes of efficiency, a reference array object descriptor, not marked as an array object descriptor, may be used to describe an array object whose elements contain only pointers, including an array of pointers.

The remaining bits of a list object descriptor may encode the number of fields in the object (not counting the field containing the object descriptor) and the indexes of fields that do (for include list object descriptors) or do not (for exclude list object descriptors) contain pointers. Thus, if the collection size is n, then n+1 numbers may be encoded. With a check bit range 516 of 22 bits, bits 22 through 56 (35 bits) are available for this purpose. To be able to describe the greatest number of objects, these remaining bits are divided equally among the n+1 numbers, to get a range width that specifies the number of bits to use for each. When the collection size is zero, as with blob object descriptor 540, all 35 bits may be used to encode n-fields bit range 512 (e.g. bits 22 through 56). This allows the description of blobs and reference arrays of up to 34,359,738,368 words (256 GB). Blob array 540 may represent an object with 4 fields, none of which are pointers or, equivalently, a 32-byte blob. This may, for example, represent an array of 64 32-bit numbers. Accordingly, the object descriptor may comprise an indication of a size of the collection and each field offset may be represented in the object descriptor by a number of bits based on the size of the collection.

When the collection size is one, as with list object descriptors 535 and 555, the range width may be 17 bits for each of n-fields bit range 512 (e.g., bits 40 through 56) and field index bit range 514 (e.g., bits 23 through 39), with bit 22 left unused. List object descriptor 535 describes an object containing 4 fields, with a collection containing only field index 1. As list object descriptor 535 is an exclude list object descriptor, the described object would be one that contained three pointer fields at indexes 0, 2, and 3. List object descriptor 555 describes an object containing 2 fields, with a collection containing only field index one. As list object descriptor 555 is an include list object descriptor, the described object would be one that contained one pointer field at index 1.

When the collection size is two, as with list object descriptor 530, the range width may be 11 bits for n-fields bit range 512 (e.g., bits 46 through 56) and each of two instances of field index bit range 514 (e.g., bit 35 through 45 and 24 through 34). List object descriptor 530 may describe an object containing 7 fields, of which fields at indexes 0 and 4 are pointer fields. List object descriptors with collection sizes of 3, 4, 5, 6, and 7 may have range widths of 8, 7, 5, 5, and 4 respectively.

When check bits are unnecessary (e.g., when there is no question of what is or is not a pointer), more bits (e.g., 57) may be available to for the n-fields bit range 512 and field-index bit ranges 514. The range widths associated with different collection sizes may become 57 (for a collection size of 0), 28 (1), 19 (2), 14 (3), 11 (4), 9 (5), 8 (6), 7 (7). The number of bits used for the collection size bit range 510 may be extended to allow for larger collections with correspondingly smaller maximum numbers of fields described.

When an object descriptor is a list object descriptor, size determiner 116 may compute a number of fields by extracting the content of the n-fields bit range 512. Example list object descriptor 530 may indicate that the object contains 7 fields, exclusive of the object descriptor. When the object descriptor is an include list object descriptor, field enumerator 118 may enumerate pointer field indexes for the object descriptor as the contents of each of the field-index bit ranges 514. Example include list object descriptor 530 may indicate pointer field indexes of 0 and 4. When the object descriptor is an exclude list object descriptor, field enumerator 118 may enumerate pointer field indexes for the object descriptor by enumerating from zero up to, but not including, the number of fields determined by size determiner 116, omitting those indexes that are the contents of each of the field-index bit ranges 514. Example exclude list object determiner 535 may indicate pointer field indexes of 0, 2, and 3, which may be enumerated by enumerating from 0 through 3 and skipping 1 as the contents of field-index bit range 514. When there are multiple instances of field-index bit range in a list object descriptor, the contents of the bit range may be constrained to appear in a particular order (e.g., having increasing values). Validator 114 may determine that a putative list object descriptor is not a valid object descriptor when any the field index indicated by the contents of any field-index bit range 514 is greater than or equal to the number of fields indicated by the object descriptor. Validator 114 may further determine that a putative list object descriptor is not a valid object descriptor when the contents of the field-index bit ranges violate an ordering constraint.

In aspects where the object descriptor includes a description of a collection of field offsets, field enumerator 118 may compute field memory addresses based on the collection of field offsets and the first memory address when enumerating fields associated with the object. Field enumerator may exclude each field with a corresponding field in the collection of field offsets from the enumeration.

System 100 may include list object descriptors in other formats identifiable by object descriptor format determiner 110, allowing further types of object to be described by a compact object descriptor. A run list object descriptor may contain a collection of pairs of numbers, each indicating a start position and a run length, indicating that all field indexes from the indicated start position and continuing through the indicated run length number of fields are or are not pointer field indexes. An alternating list object descriptor may treat the contents of the first field-index bit range 513 as an initial number of field indexes representing pointer field indexes, the contents of the next field-index bit range 513 as a following number of field indexes representing non-pointer field indexes, and so on.

When an object descriptor is a bitmap object descriptor, a bitmap-n-fields bit range 518 (e.g., bits 55 through 60) may indicate the number of fields in the described object, and the pointer field indexes may be indicated by the contents of a bitmap bit range 520 (e.g., bits 24 through 55). The width of the bitmap bit range 520 may be a power of two (e.g., 32 bits) and the width of the bitmap-n-fields bit range 518 may be the binary logarithm of the width of the bitmap bit range 520 (e.g., 5 bits). The contents of bitmap-n-fields bit range 518 may be one less than the number of fields in the described object. For a 5-bit-wide bitmap-n-fields bit range 518, this allows the description of objects containing from 1 through 32 fields. Each bit of bitmap field range 520 may indicate whether a particular field index is a pointer field, with the least significant bit corresponding to field index zero. A value of 1 for a bit may indicate that the corresponding field index is a pointer field index, while a value of 0 may indicate that the corresponding field index is not a pointer field index. Size determiner 116 may determine the number of fields by adding 1 to the value contained in the bitmap-n-fields bit range 518. Example bitmap object descriptor 545 may indicate that the described object has 24 fields.

To enumerate pointer field indexes, field enumerator 118 may extract the content of bitmap field range 520 and initialize a counter to zero. It may then test the least significant bit of the extracted value. If this bit is set, field enumerator 118 may enumerate the value of the counter as a pointer field index. The extracted value may be shifted one bit to the right and the counter may be incremented. This may be repeated once for each field. Validator 114 may determine that a putative bitmap object descriptor. is not a valid object descriptor if bitmap bit range 520 contains any bits with a value of 1 corresponding to field indexes greater than or equal to the number of fields. In aspects where the object descriptor comprises a bitmap, enumerating fields associated with an object may include determining bits in the bitmap that have a particular value.

When the object descriptor is an external object descriptor, the pointer field bit range 522 (e.g., bits 0 through 60) may contain information sufficient to allow any process in the system 100 to construct a pointer to an external descriptor object on the shared heap 126 (e.g., external descriptor object 160). Multiple external object descriptors may point to the same external descriptor object. When an object type is described by an external object descriptor, different external object descriptors may refer to external descriptor objects. The external descriptor object may be allocated in the normal way, may be subject to garbage collection, and may contain an object descriptor. As described above, the external descriptor object may contain a check pointer discoverable by validator 114. In an example system, the check pointer may be stored at a well-known offset from the first word of the external descriptor object. The check pointer may be a pointer to the external descriptor object. For example, word 164 may be the check pointer for external descriptor object 160 and may point to external descriptor object 160. The external descriptor object may contain the number of fields in the described object, e.g., at word 164, and size determiner 116 may inspect or interact with the external descriptor object to obtain the number of fields. The external descriptor object may contain data sufficient to enumerate the pointer field indexes associated with the object, and field enumerator 118 may inspect or interact with the external descriptor object to enumerate the pointer field indexes, Sufficient data may include an array of (or reference to an array of) numbers that indicate field indexes that do or do not represent pointer field indexes, an array of (or reference to an array of) pairs of numbers that represent starts and extents of runs of pointer field indexes, or other data. Different external descriptor objects may contain different sufficient data and may be instances of different subclasses of a common superclass. Field enumerator 118 may interact with the external descriptor object by means of a dynamic dispatch method, which may involve a virtual function call, a method invocation, or the inspection of a value contained in the external descriptor object that identifies the format or subclass of the external descriptor object.

When a process requests the allocation within the shared heap 126 of an object of a specified type, the system 100 allocate a region of the shared heap 126 of sufficient size to contain an object of the specified type and may ensure that before the program can use a pointer to the newly allocated object, the memory region contains a valid object descriptor that describes the allocated object. This may involve identifying an unchecked object descriptor associated with the type, where an unchecked object descriptor may be an object descriptor whose check bit range 516 is not correctly set and may be zero. The unchecked object descriptor may be converted into a valid object descriptor for the object as it is placed in the appropriate memory word. If the object descriptor is a compact object descriptor, the correct verification information may be computed based on the address of the memory word, and the check bit range 516 of the object descriptor may be set accordingly. If the object descriptor is an external object descriptor, it may be validated on the basis of the check pointer contained in the referenced external descriptor object, and no modification may be required. In other words, a request to allocate a second object in the shared memory heap may be received, a second object descriptor based on a type of the second object may be determined and a region of the shared memory heap may be allocated to the second object and the second object descriptor.

When the requested allocation is for an array of a specified number of elements, the allocated object may contain a word (e.g., the word following the object descriptor) that contains the number of elements. In aspects where the type is an array type, an array length of the second object may be determined and stored in the region of the shared memory heap.

To obtain the unchecked object descriptor, a descriptor-for-type function may be used. This function may be specialized (e.g., by means of partial template specification) to have different behavior for different types or different classes of types. The descriptor-for-type function may return the same unchecked object descriptor (or identical unchecked object descriptors) for distinct types when their patterns of pointer fields and non-pointer fields are identical. The descriptor-for-type function may be specialized to return a blob object descriptor of the appropriate size for types (e.g., number types and Boolean types, and types that have no data except for the object descriptor) that are known to not contain pointer fields. The descriptor-for-type function may be specialized to return a reference array object descriptor of the appropriate size for types (e.g., garbage-collected pointers) that are known to contain only pointer fields. For other types, the descriptor-for-type function may compute an unchecked object descriptor for the type. The resulting unchecked object descriptor may be cached so that subsequent invocations of the descriptor-for-type function for that type may use the cached value and not recompute it. The descriptor-for-type function may contain a specialization to delegate to a member function with a specific name for types that define such a function. If the member function is "descriptor( )" and a C++ class "Person" defines a function with that name, the descriptor-for-type function when obtaining an unchecked object descriptor for the Person type may obtain it by calling Person::descriptor( ).

To compute the unchecked object descriptor for a type, a number of fields for the type may be computed based on the size of objects of that type. The number of fields may be (or be based on) the number of words required to cover an instance of the type. Computing the unchecked object descriptor for a type T may also involve computing a list of pointer field indexes. To compute the list, the data members of the class may be enumerated. Each data member may be associated with an object type MT and an offset of that data member (in words) within objects of type T. descriptor-for-type may be called to obtain the unchecked object descriptor for MT, and the field enumerator 118 may be requested to enumerate the pointer field indexes for MT. These may be added to the offset and added to the pointer field index list for T. If an example data member begins in word 4 of T and has a type that has pointer field indexes 1, 3, and 7, then pointer field indexes 5, 7, and 11 may be added to the pointer field index list under construction. If type T has a superclass S whose data begins at a particular offset within instances of type T, the same procedure may be used to add pointer field indexes to the list. A system may ensure that a program that attempts to create an object descriptor and does not mention sufficient data members and fields to guarantee that all pointer field indexes are captured is an erroneous program and will fail to compile.

Given the number of fields pointer descriptor list, a most efficient unchecked object descriptor may be constructed. When determining the format to use, available formats may be considered according to a priority ordering, e.g., from most to least preferred: blob object descriptor, reference array object descriptor, include list object descriptor, exclude list object descriptor, bitmap object descriptor, external object descriptor. Different orderings may be used. The decision as to whether to use an include list object descriptor or an exclude list object descriptor, when both are constructible, may be made based on the length of the pointer field index list. When the number of pointer field indexes is greater than half of the number of fields, an exclude list object descriptor may be preferred to an include list object descriptor. Validator 114 may use the object descriptor format priority ordering to determine that a putative object descriptor is not a valid object descriptor because an object with the layout described by the putative object descriptor would have been constructed with an object descriptor having a different object descriptor format. As an example, a putative bitmap object descriptor having a bitmap with all zero bits (indicating no pointer fields) may be determined to not be a valid object descriptor on the basis that an object it could be described would be associated with a blob object descriptor.

When an external object descriptor is constructed, an external descriptor object may be allocated on the shared heap 126. In a system employing garbage collection, a process that caches unchecked object descriptors may ensure that the external descriptor object remains reachable via a root pointer associated with the process at least as long as the external object descriptor remains cached. Example systems may reuse external descriptor objects for different types that have the layout, e.g., the same number of fields and pointer field index lists. Identity of layout may be determined on the basis of equality of a cryptographic hash (e.g., a SHA-1 hash) computed over the number of fields and the sorted pointer field index list. This reuse may be within a process or between processes accessing the shared heap 126.

To create an unchecked object descriptor when allocating an array, the allocator may request (e.g., via the descriptor-for-type function) an unchecked object descriptor for the element type of the array. It may then request that this be converted into an unchecked object descriptor for an array containing the requested number of elements.

If the element type is smaller than the size of a pointer, than it may be determined that the array will not contain any pointers, and a blob object descriptor may be constructed. To determine the number of fields in the blob (exclusive of the object descriptor), the size of the type, in bytes may be multiplied by the number of elements, and the result may be divided by the number of words, and this may be rounded up to the nearest integer. Then one more word may be added to account for the word containing the array length. If a character contains two bytes, then an example array of 10 characters may require 20 bytes. If a word contains eight bytes, then the array will be 2.5 words in size, which is rounded up to 3 words to account for padding. The array length word is added in, and the resulting object descriptor is a blob object descriptor for a blob containing 4 fields. The allocator may refrain from marking this blob object descriptor as being an array object descriptor (e.g., by setting is-array bit 506).

Otherwise, if the unchecked object descriptor for the element type is a blob object descriptor, an unchecked object descript for the array may be created by creating a blob object descriptor whose field count is the number of fields in the element type object descriptor multiplied by the number of elements, plus one for the array length field. An example array of 300 twenty-word blobs may be represented by a 6,001-field blob object descriptor. Note that this blob object descriptor may not be marked (e.g., by is-array bit 506) as being an array object descriptor. If the resulting number of fields is too large to fit in the n-fields bit range 512 for a blob object descriptor, this optimization may not be used.

If the unchecked object descriptor for the element type is a reference array object descriptor, an unchecked object descript for the array may be created by creating a reference array object descriptor whose field count is the number of fields in the element type object descriptor multiplied by the number of elements, plus one for the array length field. An example array of 25 one-word reference arrays (e.g., pointers) may be represented by a 26-field reference array object descriptor. Note that this reference array object descriptor may not be marked (e.g., by is-array bit 506) as being an array object descriptor. If the resulting number of fields is too large to fit in the n-fields bit range 512 for a reference array object descriptor, this optimization may not be used.

If none of the special cases apply, the unchecked object descriptor for the array may be the unchecked object descriptor for the element type with the is-array bit 506 set, creating an array object descriptor.

In some aspects, an action may be performed based on each field of the enumerated fields. For example, in a system employing garbage collection, a GC handler 119 may identify a first object as reachable during a tracing phase of a garbage collection cycle and mark a region of memory, based on the first memory address and the size, as containing a reachable object. GC handler 119 may also identify a second object associated with a reference contained in each enumerated field and identify the second object as reachable.

As another example, in a system employing reference counting, a reference handler 120 may modify a first reference count associated with the first object and determine that the modified first reference count has a value indicating that there are no remaining references to the first object. Reference handler 120 may also modify a second reference count associated with a second object associated with a reference contained in each enumerated field and make a region of memory based on the first memory address and the size available to an allocator.

Figure 2:
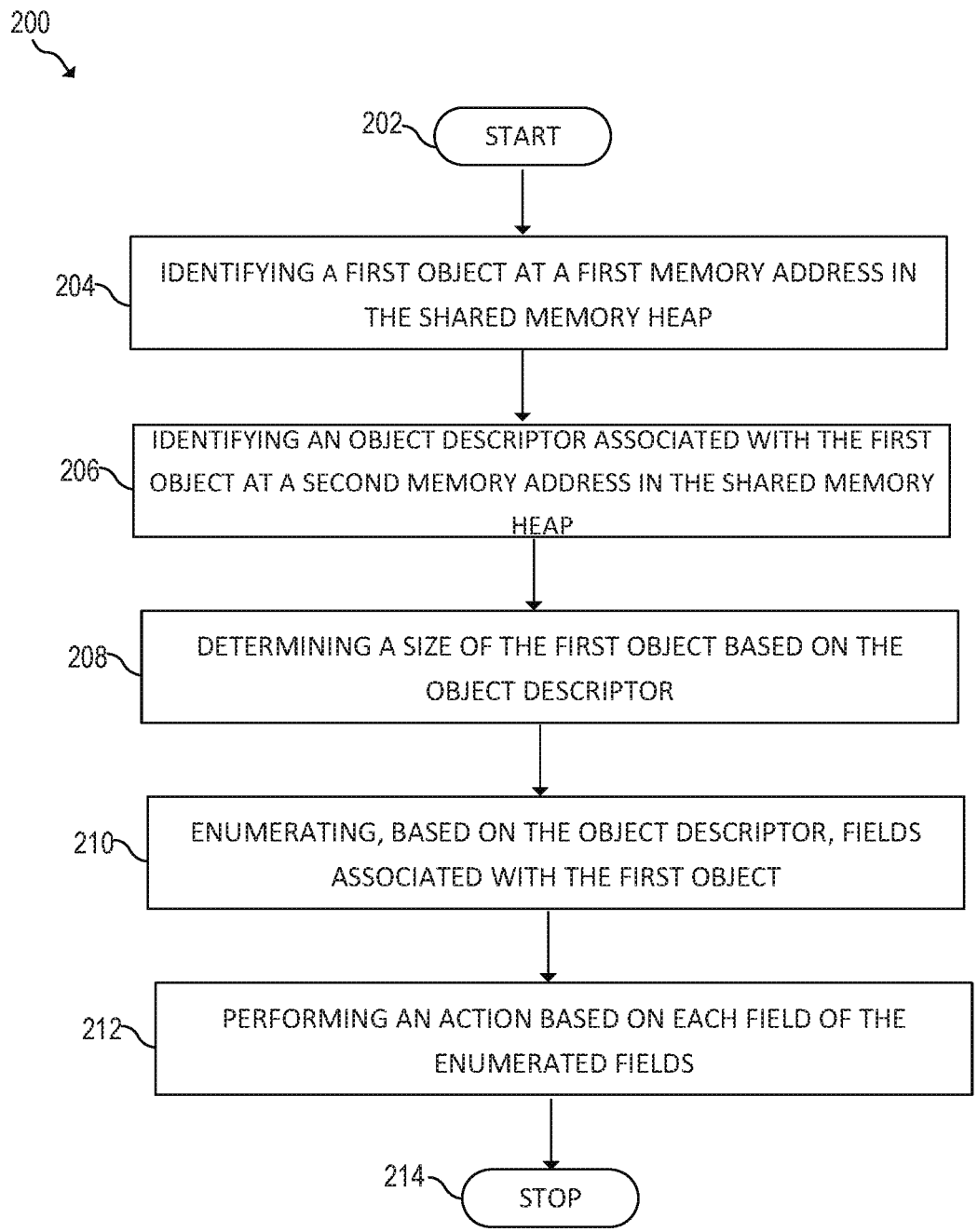
FIG. 2 is a flowchart of an example method for using object descriptors.

FIG. 2 is a flowchart of an example method 200 for using object descriptors. Method 200 may be described below as being executed or performed by a system, for example, system 100 of FIG. 1A, system 300 of FIG. 3, and/or system 400 of FIG. 4. Other suitable systems and/or computing devices may be used as well.

Method 200 may be implemented in the form of executable instructions stored on at least one machine-readable storage medium of the system and executed by at least one processor of the system. The processor may include a Central Processing Unit (CPU), Graphics Processing Unit (GPU), Field-Programmable Gate Array (FPGA), Application-Specific Integrated Circuit (ASIC) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include identifying, by a first operating system process in a computer system accessing a shared memory heap, a first object at a first memory address in the shared memory heap. The first object may have been previously allocated in the shared memory heap by a second operating system process in the computer system different from the first operating system process. The first object may be of a type not known to the first operating system process. At block 206, the method may include identifying, based on the first memory address, an object descriptor associated with the first object at a second memory address in the shared memory heap. The object descriptor occupies a number of bits of memory independent of the type. At block 208, the method may include determining a size of the first object based on the object descriptor. At block 210, the method may include enumerating, based on the object descriptor, fields associated with the first object. At block 212, the method may include performing an action based on each field of the enumerated fields. Method 200 may eventually continue to block 214, where method 200 may stop.

Figure 3:
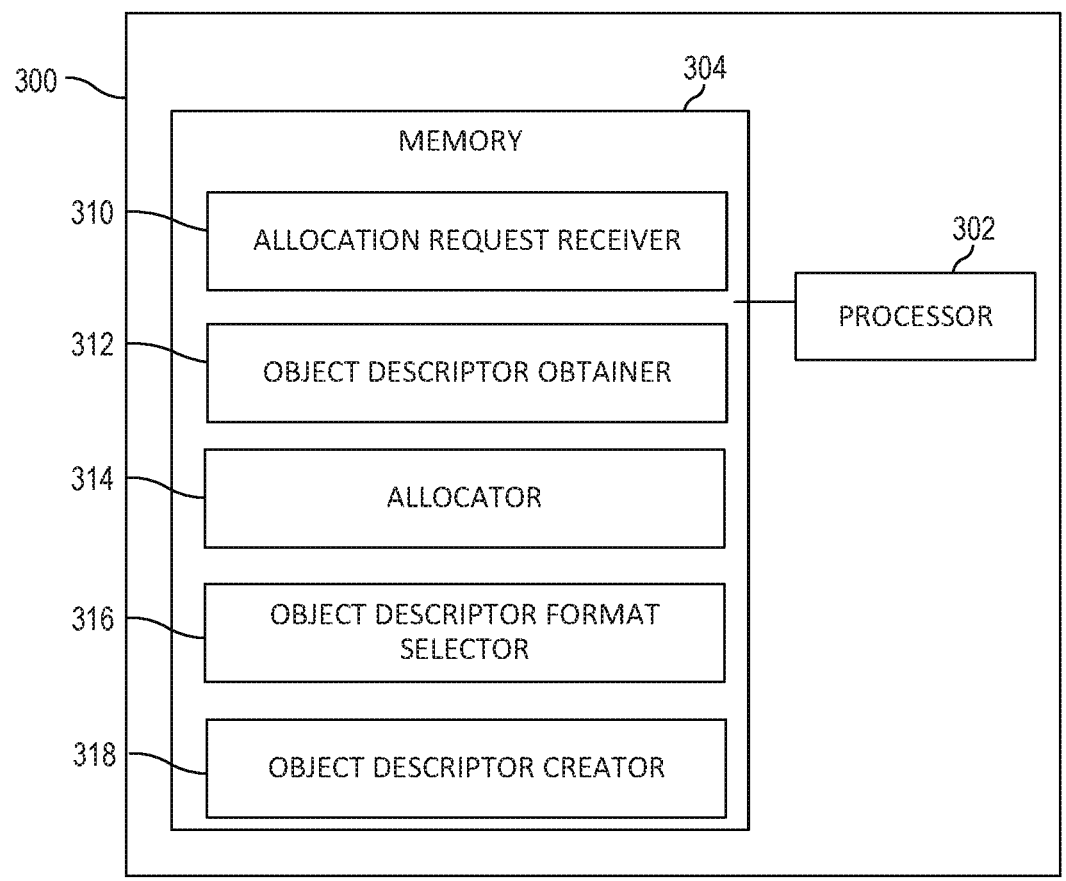
FIG. 3 is a block diagram of an example system for object descriptors.

FIG. 3 is a block diagram of an example system 300 for object descriptors. System 300 may include a processor 302 and a memory 304 that may be coupled to each other through a communication link (e.g., a bus). Processor 302 may include a Central Processing Unit (CPU), Graphics Processing Unit (GPU), Field-Programmable Gate Array (FPGA), Application-Specific Integrated Circuit (ASIC) or another suitable hardware processor. In some examples, memory 304 stores machine readable instructions executed by processor 302 for system 300. Memory 304 may include any volatile memory, non-volatile memory, or any suitable combination of volatile and non-volatile memory. Memory 304 may comprise Random Access Memory (RAM), Read-Only Memory (ROM), flash memory, memristor memory, resistive memory, phase-change memory, spin-transfer torque memory, and/or other suitable memory. Memory 304 may also include a random access non-volatile memory that can retain content when the power is off.

Memory 304 stores instructions to be executed by processor 302 including instructions for allocation request receiver 310, object descriptor obtainer 312, allocator 314, object descriptor format selector 316 and object descriptor creator 318. The components of system 300 may be implemented in the form of executable instructions stored on at least one machine-readable storage medium of system 300 and executed by at least one processor of system 300. The machine-readable storage medium may be non-transitory. Each of the components of system 300 may be implemented in the form of at least one hardware device including electronic circuitry for implementing the functionality of the component.

Figure 4:
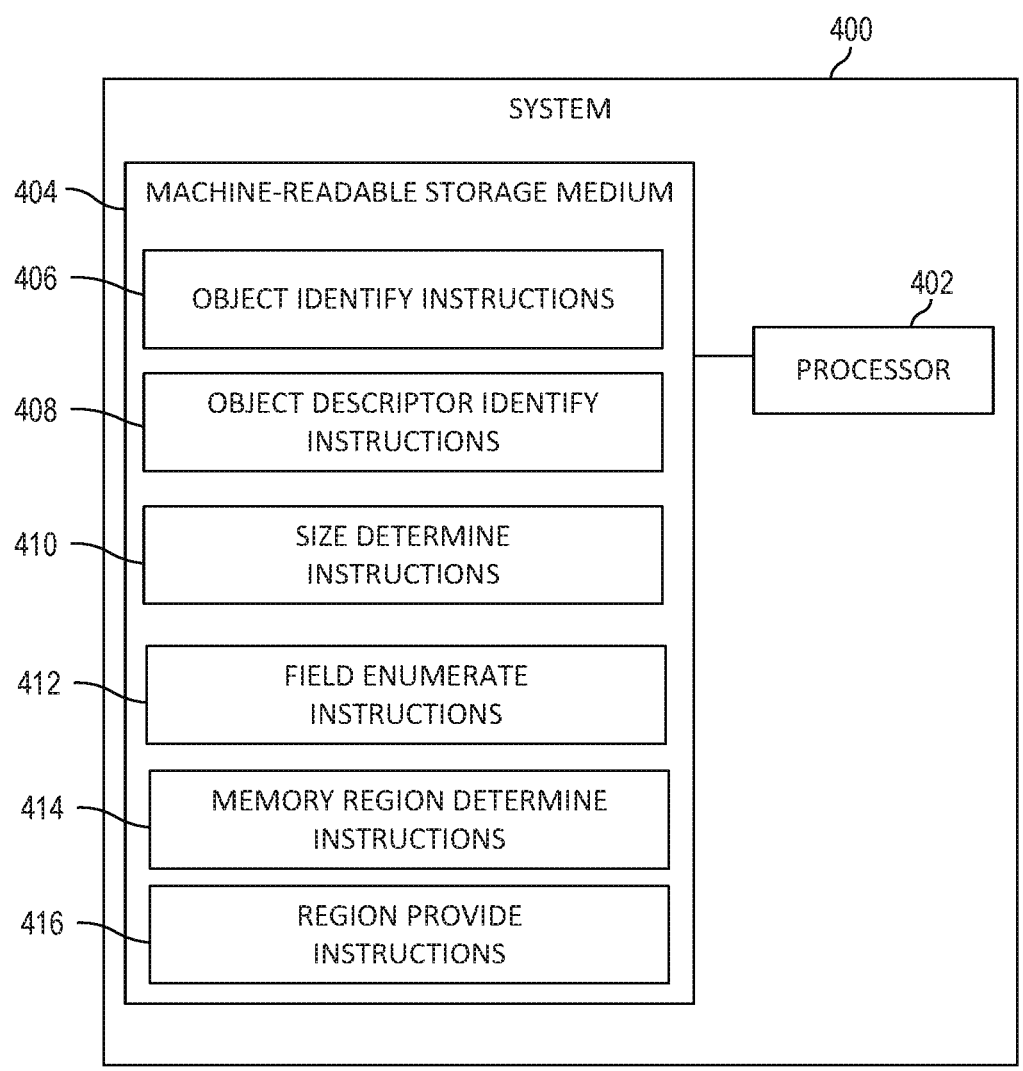
FIG. 4 is a block diagram of an example system for object descriptors.

Processor 302 may execute instructions of allocation request receiver 310 to receive a request to allocate an instance of an object type on a shared heap accessed by a first process different from the process executing the instructions of allocation request receiver 310. The object type may be unknown to the first process. Processor 302 may execute instructions object descriptor obtainer 312 to obtain an object descriptor associated with the object type. Processor 302 may execute instructions of allocator 314 to allocate the instance in a region of memory in the shared heap and insert the object descriptor in the region of memory. Processor 302 may execute instructions of object descriptor format selector 316 to select a format for the object descriptor. Processor 302 may execute instructions of object descriptor creator 318 to create an object descriptor according to the selected format. The object descriptor may contain sufficient information to allow the first process to determine a size of the instance and to enumerate fields associated with the instance. Each enumerated field refers to an object in the shared memory FIG. 4 is a block diagram of an example system 400 for object descriptors. System 400 may be similar to system 100 of FIG. 1A, for example. In the example illustrated in FIG. 4, system 400 includes a processor 402 and a machine-readable storage medium 404. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), Graphics Processing Unit (GPU), Field-Programmable Gate Array (FPGA), Application-Specific Integrated Circuit (ASIC) microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412, 414 and 416 to use object descriptors. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), memristor memory, resistive memory, phase-change memory, spin-transfer torque memory, a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, object identify instructions 406, when executed by a processor (e.g., 402), may cause system 400 to identify by a first operating system process in a computer system accessing a shared memory heap, a first object at a first memory address in the shared memory heap. The first object may have been previously allocated in the shared memory heap by a second operating system process in the computer system different from the first operating system process. The first object may be of a type not known to the first operating system process. Object descriptor identify instructions 408, when executed by a processor (e.g., 402), may cause system 400 to identify, based on the first memory address, an object descriptor associated with the first object at a second memory address in the shared memory heap. The object descriptor may occupy a number of bits of memory independent of the type. Size determine instructions 410, when executed by a processor (e.g., 402), may cause system 400 to determine a size of the first object based on the object descriptor. Field enumerate instructions 412, when executed by a processor (e.g., 402), may cause system 400 to enumerate, based on the object descriptor, fields associated with the first object. Each field may correspond to at least one other object referenced by the first object. Memory region determine instructions 414, when executed by a processor (e.g., 402), may cause system 400 to determine, based on the size and the enumerated fields, that a region of memory within the shared heap does not contain any reachable objects. Region provide instructions 416, when executed by a processor (e.g., 402), may cause system 400 to provide the region of memory to an allocator.

The foregoing disclosure describes a number of examples for using object descriptors. The disclosed examples may include systems, devices, computer-readable storage media, and methods for using object descriptors. For purposes of explanation, certain examples are described with reference to the components illustrated in FIGS. 1A-4. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
identifying, by a first operating system process in a computer system accessing a shared memory heap, a first object at a first memory address in the shared memory heap, wherein the first object was previously allocated in the shared memory heap by a second operating system process in the computer system different from the first operating system process and the first object is of a type not known to the first operating system process;
identifying, based on the first memory address, an object descriptor associated with the first object at a second memory address in the shared memory heap, wherein the object descriptor occupies a number of bits of memory independent of the type;
determining a size of the first object based on the object descriptor;
enumerating, based on the object descriptor, fields associated with the first object; and
performing an action based on each field of the enumerated fields.

2. The method of claim 1, further comprising:
determining that the object descriptor is an external object descriptor; and
determining the size based on an external descriptor object referenced by the object descriptor.

3. The method of claim 1, wherein the object descriptor comprises a bitmap and enumerating fields associated with the first object includes determining bits in the bitmap that have a particular value.

4. The method of claim 1, further comprising:
determining that the object descriptor is an array descriptor;
identifying the first object as an array;
determining an array length of the array based on a third memory address in the shared memory heap relative to the second memory address; and
enumerating fields associated with the first object by enumerating, based on the object descriptor, fields associated with each element of the array.

5. The method of claim 1, further comprising:
identifying the first object as reachable during a tracing phase of a garbage collection cycle;
marking a region of memory based on the first memory address and the size as containing a reachable object;
identifying, as part of the action, a second object associated with a reference contained in each enumerated field; and
identifying the second object as reachable.

6. The method of claim 1, further comprising:
modifying a first reference count associated with the first object;
determining that the modified first reference count has a value indicating that there are no remaining references to the first object;
modifying, as part of the action, a second reference count associated with a second object associated with a reference contained in each enumerated field; and
making a region of memory based on the first memory address and the size available to an allocator.

7. The method of claim 1, further comprising:
receiving a request to allocate a second object in the shared memory heap;
determining a second object descriptor based on a type of the second object; and
allocating a region of the shared memory heap to the second object and the second object descriptor.

8. The method of claim 7 wherein the type is an array type, the method further comprising:
determining an array length of the second object; and
storing the array length in the region.

9. The method of claim 1, further comprising:
identifying a putative object reference;
identifying, based on the putative object reference, a putative object descriptor comprising verification information;
determining a validity of the putative object descriptor based on the verification; and
determining that the putative object reference is not an object reference based on the validity.

10. The method of claim 9, wherein determining the validity includes comparing the verification information with a value computed based on an address of the putative object descriptor.

11. The method of claim 1 wherein the object descriptor includes a description of a collection of field offsets and enumerating fields associated with the object includes computing field memory addresses based on the collection of field offsets and the first memory address.

12. The method of claim 11, comprising:
excluding each field with a corresponding field in the collection of field offsets from the enumeration.

13. The method of claim 11, wherein the object descriptor comprises an indication of a size of the collection and each field offset is represented in the object descriptor by a number of bits based on the size of the collection.

14. A system comprising:
an allocation request receiver to receive a request to allocate an instance of an object type on a shared heap accessed by a process, wherein the object type is unknown to the process;
an object descriptor obtainer to obtain an object descriptor associated with the object type;
an allocator to allocate the instance in a region of memory in the shared heap and insert the object descriptor in the region of memory;
an object descriptor format selector to select a format for the object descriptor; and
an object descriptor creator to create an object descriptor according to the selected format, wherein the object descriptor contains sufficient information to allow the process to determine a size of the instance and to enumerate fields associated with the instance, wherein each enumerated field refers to an object in the shared memory.

15. A non-transitory machine-readable storage medium encoded with instructions, the instructions executable by a hardware processor of a system to cause the system to:
identify by a first operating system process in a computer system accessing a shared memory heap, a first object at a first memory address in the shared memory heap, wherein the first object was previously allocated in the shared memory heap by a second operating system process in the computer system different from the first operating system process and the first object is of a type not known to the first operating system process;

identify, based on the first memory address, an object descriptor associated with the first object at a second memory address in the shared memory heap, wherein the object descriptor occupies a number of bits of memory independent of the type;

determine a size of the first object based on the object descriptor;

enumerate, based on the object descriptor, fields associated with the first object;

determine, based on the size and the enumerated fields, that a region of memory within the shared heap does not contain any reachable objects; and provide the region of memory to an allocator.

* * * * *